United States Patent
Li et al.

(10) Patent No.: US 12,439,420 B2
(45) Date of Patent: Oct. 7, 2025

(54) MULTICARRIER SCHEDULING METHOD AND APPARATUS, AND DEVICE

(71) Applicant: VIVO MOBILE COMMUNICATION CO., LTD., Dongguan (CN)

(72) Inventors: Na Li, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 461 days.

(21) Appl. No.: 17/989,678

(22) Filed: Nov. 17, 2022

(65) Prior Publication Data

US 2023/0083549 A1  Mar. 16, 2023

Related U.S. Application Data

(63) Continuation of application No. PCT/CN2021/094339, filed on May 18, 2021.

(30) Foreign Application Priority Data

May 20, 2020 (CN) .......................... 202010432806.3

(51) Int. Cl.
  *H04W 72/23* (2023.01)
  *H04L 5/00* (2006.01)
  *H04W 72/0453* (2023.01)

(52) U.S. Cl.
  CPC ........... *H04W 72/23* (2023.01); *H04L 5/0098* (2013.01); *H04W 72/0453* (2013.01)

(58) Field of Classification Search
  CPC . H04W 72/23; H04W 72/0453; H04W 72/11; H04W 72/115; H04W 72/232;
  (Continued)

(56) References Cited

U.S. PATENT DOCUMENTS

2011/0116454 A1  5/2011  Chen et al.
2012/0327877 A1  12/2012  Zhao et al.
(Continued)

FOREIGN PATENT DOCUMENTS

CN  102055570 A  5/2011
CN  102415195 A  4/2012
(Continued)

OTHER PUBLICATIONS

International Search Report issued in corresponding International Application No. PCT/CN2021/094339, mailed Jul. 14, 2021, 4 pages.
(Continued)

*Primary Examiner* — Dady Chery
(74) *Attorney, Agent, or Firm* — IPX PLLC

(57) ABSTRACT

A multicarrier scheduling method and apparatus, and a device, are provided. The method includes: receiving DCI sent by a network device, where the DCI is used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling; and both M and N are integers greater than or equal to 2, both X and Y are positive integers, M is less than or equal to N, and a sum of X and Y is less than or equal to N.

20 Claims, 6 Drawing Sheets

(58) Field of Classification Search
CPC ..... H04L 5/0098; H04L 5/001; H04L 5/0048; H04L 5/0053; H04L 5/0057; H04L 5/0094
See application file for complete search history.

(56) References Cited

U.S. PATENT DOCUMENTS

| | | | | |
|---|---|---|---|---|
| 2015/0063179 | A1* | 3/2015 | Yang | H04L 5/14 370/280 |
| 2018/0338301 | A1* | 11/2018 | Gao | H04W 72/23 |
| 2019/0132092 | A1 | 5/2019 | Chen et al. | |
| 2019/0261386 | A1* | 8/2019 | Li | H04W 80/08 |
| 2020/0045706 | A1 | 2/2020 | Shin et al. | |
| 2020/0374091 | A1* | 11/2020 | Shao | H04L 5/1469 |
| 2023/0139850 | A1* | 5/2023 | Shao | H04L 5/0082 370/330 |

FOREIGN PATENT DOCUMENTS

| | | |
|---|---|---|
| CN | 108029088 A | 5/2018 |
| CN | 108633070 A | 10/2018 |
| CN | 111065165 A | 4/2020 |
| WO | 2019028890 A1 | 2/2019 |

OTHER PUBLICATIONS

NTT Docomo, Inc., "Physical Layer Enhancements for DL SPS ", 3GPP TSG RAN WG1 #97 R1-1906219, May 2019, 7 pages.
First Office Action issued in related Chinese Application No. 202010432806.3, mailed Apr. 21, 2022, 8 pages.
Second Office Action issued in related Chinese Application No. 202010432806.3, mailed Nov. 3, 2022, 7 pages.
International Search Report issued in corresponding International Application No. 21807511.7, mailed Aug. 4, 2023, 8 pages.
Notice of reason of refusal issued in related Japanese Application No. 2022-564097, mailed Aug. 15, 2023, 5 pages.

* cited by examiner

MULTICARRIER SCHEDULING METHOD AND APPARATUS, AND DEVICE

CROSS-REFERENCE TO RELATED APPLICATIONS

This application is a continuation of International Application No. PCT/CN2021/094339, filed on May 18, 2021, which claims priority to Chinese Patent Application No. 202010432806.3, filed on May 20, 2020. The entire contents of each of the above-identified applications are expressly incorporated herein by reference.

TECHNICAL FIELD

This application relates to the field of communications technologies, and specifically relates to a multicarrier scheduling method and apparatus, and a device.

BACKGROUND

Generally, to enhance coverage of a control channel, some cells are deployed on a low-band Component Carrier (CC). Because bandwidth of the low-band CC is limited, a design of using one piece of Downlink Control Information (DCI) to schedule one cell will lead to large overheads of downlink control signaling in the cell, thereby affecting a capacity of a communications system. Therefore, a design is proposed for simultaneously and dynamically scheduling a plurality of cells or CCs by using one piece of DCI, to reduce overheads of downlink control signaling.

However, in a case that User Equipment (UE) supports simultaneous dynamic scheduling of a plurality of CCs by using one piece of DCI, and at least one semi-persistent configuration is configured for each CC, such as DownLink Semi-Persistent Scheduling (DL SPS) and/or at least one UpLink Configuration Grant (UL CG), because DCI of one scheduling cell can only be used to perform semi-persistent scheduling on one semi-persistent configuration on a self-cell (self-carrier) or a scheduled cell, a plurality of pieces of DCI may be used to schedule semi-persistent configurations on a plurality of CCs, thereby causing large overheads of downlink control signaling and increasing complexity of detecting downlink control signaling by the UE.

SUMMARY

A multicarrier scheduling method and apparatus, and a device, are provided.

According to a first aspect, an embodiment of this application provides a multicarrier scheduling method. The method includes: receiving DCI sent by a network device, where the DCI is used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

According to a second aspect, an embodiment of this application provides a multicarrier scheduling method. The method includes: sending DCI to UE, where the DCI is used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

According to a third aspect, an embodiment of this application provides a multicarrier scheduling apparatus. The apparatus includes a receiving module. The receiving module is configured to receive DCI sent by a network device, where the DCI is used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

According to a fourth aspect, an embodiment of this application provides a multicarrier scheduling apparatus. The apparatus includes a sending module. The sending module is configured to send DCI to UE, where the DCI is used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

According to a fifth aspect, an embodiment of this application provides UE. The UE includes a processor, a memory, and a program or an instruction that is stored in the memory and that can be run on the processor, and when the program or the instruction is executed by the processor, the steps of the method in the first aspect are implemented.

According to a sixth aspect, an embodiment of this application provides a network device. The network device includes a processor, a memory, and a program or an instruction that is stored in the memory and that can be run on the processor, and when the program or the instruction is executed by the processor, the steps of the method in the second aspect are implemented.

According to a seventh aspect, an embodiment of this application provides a communications system. The communications system includes the multicarrier scheduling apparatus in the third aspect and the multicarrier scheduling apparatus in the fourth aspect; or the communications system includes the UE in the fifth aspect and the network device in the sixth aspect.

According to an eighth aspect, an embodiment of this application provides a readable storage medium. The readable storage medium stores a program or an instruction, and when the program or the instruction is executed by a processor, the steps of the method provided in the first aspect are implemented, or the steps of the method provided in the second aspect are implemented.

According to a ninth aspect, an embodiment of this application provides a chip. The chip includes a processor and a communications interface, the communications interface is coupled to the processor, and the processor is configured to run a program or an instruction to implement the method provided in the first aspect or implement the steps of the method provided in the second aspect.

DETAILED DESCRIPTION

Figure 1:
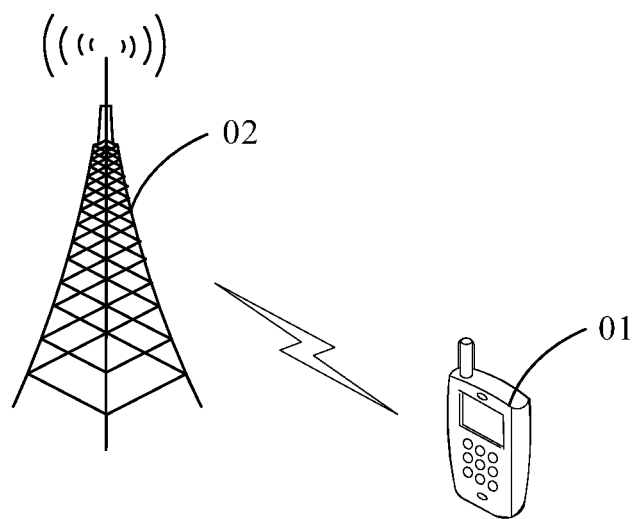
FIG. 1 is a schematic architectural diagram of a communications system according to an embodiment of this application.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first," "second," and the like are intended to distinguish between similar objects but do not describe a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

Currently, in a New Radio (NR) system, one or more CCs (or cells) can be configured for UE. When a single carrier mode or a self-cell scheduling or cross-carrier scheduling mode in Carrier Aggregation (CA) is configured for the UE, each piece of DCI of a scheduling cell can only be used to schedule one configuration on a self-cell or a scheduled cell.

In a related protocol, a downlink transmission manner and an uplink transmission manner are classified into a transmission manner based on a dynamic configuration and a transmission manner based on a semi-persistent configuration. For example, the semi-persistent configuration in the downlink transmission manner may be DL SPS, and the semi-persistent configuration in the uplink transmission manner may be a UL CG.

In the transmission manner based on the dynamic configuration, a configuration of a transmission parameter such as a time domain or frequency domain resource, a Modulation and Coding Scheme (MCS), or a DeModulation Reference Signal (DMRS) is dynamically indicated by DCI for scheduling, and the transmission is one-time transmission.

In the transmission manner based on the semi-persistent configuration, taking an example in which the semi-persistent configuration is DL SPS, a DL SPS transmission parameter is jointly configured and indicated by a higher layer and a physical layer. The higher layer is mainly used to semi-persistently configure a period of a transmission resource. The physical layer is mainly used to activate DCI to indicate a transmission parameter such as an MCS or a time-frequency resource.

Whether one piece of DCI is DCI for activating/deactivating DL SPS or DCI for dynamical scheduling is distinguished according to different Radio Network Temporary Identifiers (RNTI) for scrambling Cyclic Redundancy Check (CRC) of a PDCCH carrying the DCI. An RNTI for scrambling CRC of a Physical Downlink Control CHannel (PDCCH) on semi-persistent scheduling is performed is a Configured Scheduling Radio Network Temporary Identifier (CS-RNTI), and an RNTI for scrambling CRC of a dynamically scheduled PDCCH is a Cell Radio Network Temporary Identifier (C-RNTI). Whether one piece of DCI is DCI for activating or deactivating DL SPS is distinguished according to a specific value of some fields in the DCI.

Table 1 shows a specific field for scheduling and activating a DL SPS or UL CG configuration when the DL SPS or UL CG configuration is provided for UE.

TABLE 1

|  | DCI format 0_0/0_1/0_2 | DCI format 1_0/1_2 | DCI format 1_1 |
| --- | --- | --- | --- |
| HPN | All '0' | All '0' | All '0' |
| RV | All '0' | All '0' | Enabled transport block: All '0' |

Table 2 shows a specific field for scheduling and releasing a DL SPS or UL CG configuration when the DL SPS or UL CG configuration is provided for UE.

TABLE 2

|  | DCI format 0_0/0_1/0_2 | DCI format |
| --- | --- | --- |
| HPN | All '0'/0_1/0_2 | All '0' |
| RV | All '0' | All '0' |
| MCS | All '1' | All '1' |
| FDRA | All '1' | FFDRA type 0: All '0' |
|  |  | FFDRA type 1: All '1' |

Table 3 is a specific field for scheduling and activating one of a plurality of DL SPS or UL CG configurations when the plurality of DL SPS or UL CG configurations are provided for UE.

TABLE 3

|  | DCI format 0_0/0_1/0_2 | DCI format 1_0/1_2 | DCI format 1_1 |
| --- | --- | --- | --- |
| RV | All '0' | All '0' | Enabled transport block: All '0' |

Table 4 is a specific field for scheduling and releasing one or more of a plurality of DL SPS or UL CG configurations when the plurality of DL SPS or UL CG configurations are provided for UE.

TABLE 4

| | DCI format 0_0/0_1/0_2 | DCI format 1_0/1_1/1_2 |
|---|---|---|
| RV | All '0' | All '0' |
| MCS | All '1' | All '1' |
| FDRA | All '1' | FFDRA type 0: All '0' |
| | | FFDRA type 1: All '1' |

It can be learned from the foregoing Table 1 to Table 4 that activation DCI and deactivation DCI may be distinguished by using different values in a Modulation and Coding Scheme (MCS) field and a Frequency Domain Resource Assignment (FDRA) field. When one time of DL SPS is configured on one CC, a Hybrid Automatic Repeat Request (HARQ) Process Number (HPN) may be configured as a fixed value 0 and used as virtual CRC to reduce a false alarm probability of activation/deactivation DCI detection and enhance detection robustness. When a plurality of times of DL SPS are configured on one CC, an HPN is an index used to indicate a corresponding activation or deactivation configuration, and is no longer set as a fixed value. In addition, when a plurality of times of DL SPS are configured on one CC, for activation DCI, only one piece of DCI can be used to activate one time of DL SPS on one CC. For deactivation DCI, in addition to deactivating one time of DL SPS on one CC, one DCI can be used to deactivate a plurality of times of DL SPS on one CC.

In a case that UE supports simultaneous dynamic scheduling of a plurality of CCs by using one piece of DCI, and at least one semi-persistent configuration is configured for each CC, such as DL SPS and/or at least one UL CG, because DCI of one scheduling cell can only be used to perform semi-persistent scheduling on one semi-persistent configuration of a self-cell or a scheduled cell, a plurality of pieces of DCI may be used to schedule semi-persistent configurations on a plurality of CCs, thereby causing large overheads of downlink control signaling and increasing complexity of detecting downlink control signaling by the UE.

In view of the above, the embodiments of this application provide a multicarrier scheduling method and apparatus, a device, and a system. UE may receive DCI sent by a network device, where the DCI is used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N. In this solution, in a case that one piece of DCI supports scheduling of N carriers, in one manner, the network device may instruct, by using one piece of DCI, the UE to schedule semi-persistent configurations on a plurality of carriers in the N carriers; and in another manner, the network device may instruct, by using one piece of DCI, the UE to schedule semi-persistent configurations on a part of the N carriers, and schedule dynamic configurations on another part of the N carriers. Therefore, the network device does not need to deliver a plurality of pieces of DCI, thereby reducing overheads of downlink control signaling and reducing complexity of detecting downlink control signaling by the UE.

FIG. 1 is a schematic architectural diagram of a communications system according to an embodiment of this application. As shown in FIG. 1, the communications system may include UE 01 and a network device 02.

It should be noted that, in this embodiment of this application, the foregoing devices shown in FIG. 1 may be wirelessly or wiredly connected. The communications system shown in FIG. 1 may be an NR system or a subsequent evolved system. This is not specifically limited in the embodiments of this application, and may be determined according to an actual use requirement.

The UE is a device that provides a user with voice and/or data connectivity, a handheld device that has a wired/wireless connection function, or another processing device connected to a wireless modem. The UE may communicate with one or more core networks by using a Radio Access Network (RAN). The UE may be a terminal device, for example, a mobile terminal such as a mobile phone (or referred to as a "cellular" phone) and a computer that has a mobile terminal; or may be a portable, pocket-sized, handheld, computer built-in, or in-vehicle mobile apparatus that exchanges voice and/or data with the RAN, for example, a device such as a Personal Communication Service (PCS) phone, a cordless phone, a Session Initiation Protocol (SIP) phone, a Wireless Local Loop (WLL) station, or a Personal Digital Assistant (PDA). The terminal device may also be referred to as a user agent, or the like.

The network device is a device deployed in the RAN to provide a wireless communication capability for the UE. In the embodiments of this application, the network device may be a base station, and the base station may include various forms such as a macro base station, a micro base station, a relay station, and an access point. In systems using different radio access technologies, names of devices having functions of a base station may vary. For example, in a fifth generation wireless communications (5G) system, the base station may be referred to as a 5G gNB. In a fourth generation wireless communications (4G) system, such as a Long Term Evolution (LTE) system, the base station may be referred to as an evolved NodeB (eNB). In a third generation wireless communications (3G) system, the base station may be referred to as a NodeB. The name "base station" may vary with evolution of communications technologies.

Figure 2:
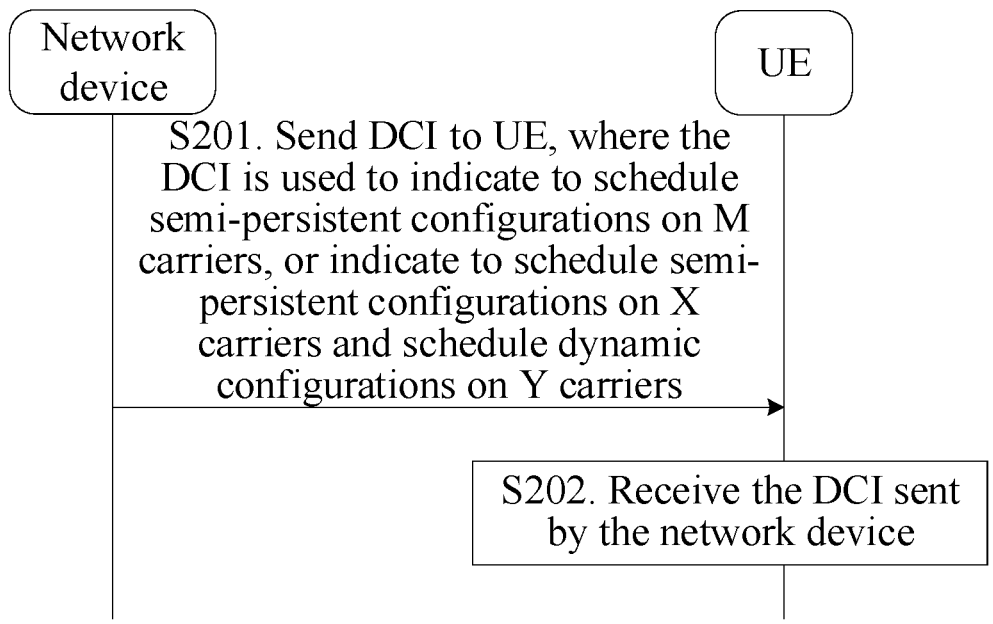
FIG. 2 is a schematic diagram of a multicarrier scheduling method according to an embodiment of this application.

Based on the communications system shown in FIG. 1, as shown in FIG. 2, an embodiment of this application provides a multicarrier scheduling method.

S201. A network device sends DCI to UE, where the DCI is used to indicate to schedule semi-persistent configurations on M carriers, or indicate to schedule semi-persistent configurations on X carriers and schedule dynamic configurations on Y carriers.

S202. Receive the DCI sent by the network device.

The M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

In this embodiment of this application, the network device may send one piece of DCI to the UE, which may be referred to as single DCI. The single DCI may indicate to schedule semi-persistent configurations on a plurality of carriers in N carriers on which the single DCI supports scheduling; or the single DCI may indicate to schedule a semi-persistent configuration on at least one of N carriers on which the single DCI supports scheduling, and schedule a dynamic configuration on at least one other carrier in the N carriers.

In some implementations, the semi-persistent configuration may include at least one of the following: DL SPS, a UL CG, uplink semi-persistent Channel State Information (semi-persistent CSI), and an uplink semi-persistent Sounding Reference Signal (semi-persistent SRS).

In some implementations, the dynamic configuration includes at least one of the following: a Physical Downlink Shared CHannel (PDSCH), a Physical Uplink Shared CHannel (PUSCH), aperiodic Channel State Information (aperiodic CSI), and an aperiodic Sounding Reference Signal (aperiodic SRS).

It should be noted that both the semi-persistent configuration and the dynamic configuration are exemplary descriptions. It can be understood that the semi-persistent configuration and the dynamic configuration may be any other possible semi-persistent configuration and dynamic configuration. This is not limited in this embodiment of this application.

In some implementations, there is one semi-persistent configuration on each of the M carriers or the X carriers. For example, it is assumed that single DCI supports scheduling on a CC #0, a CC #1, a CC #2, a CC #3, a CC #4, and a CC #5. The single DCI may indicate to schedule semi-persistent configurations on the CC #0 and the CC #1, and there is one semi-persistent configuration on each of the CC #0 and the CC #1.

In some implementations, there is at least one semi-persistent configuration on each of at least one carrier in the M carriers or the X carriers. For example, it is assumed that single DCI supports scheduling on a CC #0, a CC #1, a CC #2, a CC #3, a CC #4, and a CC #5. The single DCI may indicate to schedule semi-persistent configurations on the CC #0 and the CC #1, and there is one semi-persistent configuration on the CC #0 and a plurality of semi-persistent configurations on the CC #1.

In some implementations, the DCI may be carried on one of the N carriers; or the DCI is carried on a carrier different from the N carriers.

For example, it is assumed that single DCI supports scheduling on a CC #0, a CC #1, a CC #2, a CC #3, a CC #4, and a CC #5. In one scenario, the single DCI may be carried on any carrier in the five carriers. In some implementations, the carrier carrying the single DCI is one of carriers on which semi-persistent configurations are scheduled, or the carrier carrying the single DCI is one of carriers on which dynamic configurations are scheduled, or the carrier carrying the single DCI is one carrier in the five carriers except a carrier on which a semi-persistent configuration is scheduled and a carrier on which a dynamic configuration is scheduled. In another scenario, the single DCI may be carried on a carrier other than the five carriers. For example, the single DCI may be carried on the CC #6. This may be determined according to an actual use requirement.

In some implementations, the scheduling semi-persistent configurations on M carriers may include any one of the following:

(1) activating (active) the semi-persistent configurations on the M carriers;

(2) deactivating (inactive) and/or releasing (release) the semi-persistent configurations on the M carriers;

(3) retransmitting (re-transmission) the semi-persistent configurations on the M carriers;

(4) activating semi-persistent configurations on P carriers, and deactivating and/or releasing semi-persistent configurations on Q carriers;

(5) activating the semi-persistent configurations on the P carriers, and retransmitting the semi-persistent configurations on the Q carriers; and (6) deactivating and/or releasing the semi-persistent configurations on the P carriers, and retransmitting the semi-persistent configurations on the Q carriers, where both P and Q are positive integers, and a sum of P and Q is M.

In some implementations, the scheduling semi-persistent configurations on X carriers and scheduling dynamic configurations on Y carriers may include any one of the following:

(a) activating the semi-persistent configurations on the X carriers, and initially transmitting or retransmitting the dynamic configurations on the Y carriers;

(b) deactivating and/or releasing the semi-persistent configurations on the X carriers, and initially transmitting or retransmitting the dynamic configurations on the Y carriers; and (c) retransmitting the semi-persistent configurations on the X carriers, and initially transmitting or retransmitting the dynamic configurations on the Y carriers.

In some implementations, the DCI may include a first indication field. The first indication field may be used to indicate the M carriers or the first indication field may be used to indicate the X carriers and the Y carriers.

In some implementations, the first indication field may be any one of the following: an existing field in the DCI, a field obtained by extending the existing field in the DCI, and an independent field added to the DCI.

In a case that the first indication field is the existing field in the DCI, a field used to indicate a scheduled cell does not need to be set in the DCI. For example, for the foregoing (1) to (3), the existing field is a Cross-carrier Indication Field (CIF) in the existing DCI, and one scheduling cell/carrier (scheduling CC) and a plurality of scheduled cells/carriers (scheduled CCs) may be semi-persistently configured at a higher layer. For another example, for the foregoing (4) to (5) and (a) to (c), one scheduling cell/carrier and a plurality of scheduled cells/carriers are semi-persistently configured at a higher layer. As shown in the foregoing Table 1 to Table 4, all specific fields of each scheduled cell are independently configured.

In a case that the first indication field is the field obtained by extending the existing field in the DCI, a field used to indicate a scheduled cell needs to be set in the DCI, and the field is extension or enhancement of a related field in the existing DCI. For example, a CIF and/or a BandWidth Part field (BWP field) and/is extended, and physical meanings of the CIF and the BWP are redefined, for example, an index value of a multicarrier scheduled CC, and/or an index value of a multicarrier scheduled CC and an index value of a BWP on the CC. The higher layer is allowed to configure a same CIF value for a plurality of scheduled CCs, for example, the higher layer configures CIF=1 for a scheduled CC #0 and a scheduled CC #1 and CIF=2 for a scheduled CC #2 and a scheduled #3. If a CIF of single DCI is 1, the DCI is used to indicate to schedule the CC #0 and the CC #1, and if a CIF of the single DCI is 2, the DCI is used to indicate to schedule the CC #2 and the CC #3. It should be noted that, for the foregoing (1) to (3), all special fields of each scheduled cell do not need to be independently configured. For the foregoing (4) to (5) and (a) to (c), all special fields of each scheduled cell (as shown in the foregoing Table 1 to Table 4) need to be independently configured.

In a case that the first indication field is the independent field added to the DCI, a field used to indicate a scheduled cell needs to be set in the DCI, and the field may be newly introduced and independently used to indicate which scheduled CCs. It should be noted that a size of the independent field is not specifically limited in this embodiment of this application.

In some implementations, the DCI may be dynamically acted on at least one carrier. In this case, a field of a scheduled cell needs to be specifically indicated. The field may be the independent field added to the DCI; or the field may be the field obtained by extending the existing field in the DCI, for example, a meaning of a codepoint of a CIF field is re-assigned. In an example in which the DCI supports scheduling on the CC #0, the CC #1, and the CC #2, Table 5 is a correspondence table between a value of a codepoint in a CIF and a scheduled CC provided in this embodiment of this application.

TABLE 5

| value of a codepoint in a CIF | Descriptions |
| --- | --- |
| 00 | One CC (for example, CC #0) |
| 01 | CC #0 and CC #1 |
| 10 | CC #1 and CC #2 |
| 11 | All CCs (CC #0, CC #1, and CC #2) |

For example, the single DCI is used to activate a semi-persistent configuration on a carrier. The single DCI may activate DL SPS or/and a UL CG on the CC #0 at a moment 1 in a slot 1, a symbol 1, and a PDCCH monitoring occasion 1 in the case of CIF=00. The single DCI may activate DL SPS or/and a UL CG on the CC #0 at a moment 2 in a slot 2, a symbol 2, and a PDCCH monitoring occasion 2 in the case of CIF=10.

In some implementations, the DCI may further include a second indication field. The second indication field may be used to indicate a semi-persistent configuration or a scheduling manner of a semi-persistent configuration, and the scheduling manner includes at least one of the following: activation, deactivation, and retransmission.

In some implementations, the second indication field may be any one of the following: an existing field (for example, an HPN field) in the DCI, a field (for example, an extended HPN field) obtained by extending the existing field in the DCI, and an independent field added to the DCI. For some implementations of the second indication field, refer to the related descriptions of the first indication field in the foregoing embodiment. Details are not described herein again.

In some implementations, the second indication field is one group of indication fields. In some implementations, the second indication field is a plurality of groups of indication fields, and a quantity of the plurality of groups of indication fields is the same as a quantity of carriers that are indicated by the first indication field and on which semi-persistent configurations are scheduled.

The case that the second indication field is one group of indication fields may include:

In some implementations, if at least one of the M carriers or the X carriers includes a plurality of semi-persistent configurations, and the second indication field is one group of indication fields, the second indication field may be used to indicate at least one semi-persistent configuration, and the at least one semi-persistent configuration may be a semi-persistent configuration included in at least two of the M carriers or the X carriers.

In some implementations, if each of the M carriers or the X carriers includes one same semi-persistent configuration, and the second indication field is one group of indication fields, the second indication field is used to indicate a scheduling manner of the one same semi-persistent configuration.

The case that the second indication field is a plurality of groups of indication fields may include:

In some implementations, if one of the M carriers or the X carriers includes a plurality of semi-persistent configurations, and the second indication field is a plurality of groups of indication fields, one second indication field is used to indicate at least one semi-persistent configuration, and the at least one semi-persistent configuration is a semi-persistent configuration in the plurality of semi-persistent configurations.

In some implementations, if one of the M carriers or the X carriers includes one semi-persistent configuration, and the second indication field is a plurality of groups of indication fields, one second indication field is used to indicate a scheduling manner of the one semi-persistent configuration.

To better understand that the second indication field is one group of indication fields or a plurality of groups of indication fields, an example in which one or more DL SPS/UL CGs are configured on a CC is used for description in the following.

i. The DCI is acted on only one DL SPS or UL CG on the CC.

In a first scenario, a plurality of scheduled CCs share a field indicating a DL SPS or UL CG index. The field may be an independent field or extension of an existing field, such as an HPN field.

When only one DL SPS or UL CG is configured on the CC, the HPN field may be used as a specific field. When a plurality of DL SPS or UL CGs are configured on the CC, and the HPN field is used to indicate one DL SPS or UL CG index, configurations with a same DL SPS or UL CG index on the plurality of CCs are activated, deactivated, or retransmitted.

TABLE 6

| value of a codepoint in an HPN | Descriptions |
| --- | --- |
| 00 | SPS configuration #0 |
| 01 | SPS configuration #1 |
| 10 | SPS configuration #2 |
| 11 | SPS configuration #3 |

As shown in Table 6, when values of the codepoint in the HPN field of the DCI are different, different DL SPS configurations may be indicated. For example, if a value of the codepoint in the HPN is 00, it indicates that semi-persistent configuration scheduling is performed on the SPS configuration #0.

In a second scenario, a plurality of scheduled CCs have respective fields indicating DL SPS or UL CG indexes. The field may be an independent field or extension of an existing field, such as an HPN field.

When only one DL SPS or UL CG is configured on the CC, the HPN field may be used as a specific field. When a plurality of DL SPS or UL CGs are configured on the CC, an HPN field of each scheduled CC is used to indicate one DL SPS or UL CG index of the scheduled CC.

ii. The DCI is acted on all DL SPS or UL CGs on the CC. A field indicating a DL SPS or UL CG index is an independent field or extension of an existing field. For example, an HPN field may be shared or independent as a specific domain, and a fixed value is all '0'.

iii. The DCI may be dynamically acted on one or more DL SPS or UL CGs on the CC.

In a first scenario, a plurality of scheduled CCs share a field indicating a DL SPS or UL CG index. The field may be an independent field or extension of an existing field, such as an HPN field. The HPN field may be a field used to indicate one or more DL SPS or UL CG indexes. As shown in Table 7-1, configurations with a same DL SPS index on a plurality of CCs are activated, deactivated, or retransmitted. In some implementations, as shown in Table 7-2, configurations with different DL SPS indexes on a plurality of CCs are activated, deactivated, or retransmitted.

TABLE 7-1

| value of a codepoint in an HPN | Descriptions |
| --- | --- |
| 00 | SPS configuration #0 |
| 01 | SPS configuration #1 and SPS configuration #2 |
| 10 | SPS configuration #2 and SPS configuration #3 |
| 11 | SPS configuration #0, SPS configuration #1, SPS configuration #2, SPS configuration #3 |

TABLE 7-2

| value of a codepoint in an HPN | Descriptions |
| --- | --- |
| 00 | SPS configuration #0 on CC #0 and SPS configuration #1 on CC #1 |
| 01 | SPS configuration #1 on CC #0, SPS configuration #2 on CC #1, and SPS configuration #3 on CC #2 |
| 10 | SPS configuration #2 on CC #1 and SPS configuration #3 on CC #3 |
| 11 | SPS configuration #0 on CC #1, SPS configuration #1 on CC #2, SPS configuration #2 on CC #3, and SPS configuration #3 on CC #4 |

As shown in the foregoing Table 7-1, when values of the codepoint in the HPN field of the DCI are different, different DL SPS configurations may be indicated. For example, if a value of the codepoint in the HPN is 01, it indicates that the SPS configuration #1 and the SPS configuration #2 are scheduled. For another example, if a value of the codepoint in the HPN is 10, it indicates that the SPS configuration #2 and the SPS configuration #3 are scheduled.

As shown in the foregoing Table 7-2, when values of the codepoint in the HPN field of the DCI are different, different DL SPS configurations on different CCs may be indicated. For example, if a value of the codepoint in the HPN is 01, it indicates that the SPS configuration #1 on the CC #0, the SPS configuration #2 on the CC #1, and the SPS configuration #3 on the CC #2 are scheduled. For another example, if a value of the codepoint in the HPN is 10, it indicates that the SPS configuration #2 on the CC #1 and the SPS configuration #3 on the CC #3 are scheduled.

It should be noted that the foregoing table 7-1 is described by using an example in which configurations with a same DL SPS index on a plurality of CCs are activated, deactivated, or retransmitted, and the foregoing table 7-2 is described by using an example in which configurations with different DL SPS indexes on a plurality of CCs are activated, deactivated, or retransmitted. It can be understood that, for the case that configurations with a same UL CG index on a plurality of CCs are activated, deactivated, or retransmitted, or configurations with different UL CG indexes on a plurality of CCs are activated, deactivated, or retransmitted, refer to the descriptions in Table 7-1 and Table 7-2. Details are not described herein again.

In a second scenario, a plurality of scheduled CCs have respective fields indicating DL SPS or UL CG indexes. The field may be an independent field or extension of an existing field, such as an HPN field. A HPN field of each scheduled CC is used to indicate only one or more DL SPS or UL CG indexes of the scheduled CC.

In some implementations, the DCI may be scrambled.

In a first manner, if the DCI is used to indicate to perform semi-persistent scheduling on the M carriers, a CS-RNTI is used to scramble the DCI. Generally, the DCI may be carried in a PDCCH. Therefore, in the first manner, the CS-RNTI may be used to scramble CRC of the PDCCH carrying the DCI.

In a second manner, if the DCI is used to indicate to perform semi-persistent scheduling on the X carriers and perform dynamic scheduling on the Y carriers, a CS-RNTI, a C-RNTI, or a predefined RNTI is used to scramble the DCI. Generally, the DCI may be carried in a PDCCH. Therefore, in the second manner, the CS-RNTI, the C-RNTI, or the predefined RNTI may be used to scramble CRC of the PDCCH carrying the DCI.

It should be noted that the predefined RNTI is different from the existing CS-RNTI and the existing C-RNTI, and is a newly introduced or defined RNTI. When the UE detects the predefined RNTI, it indicates that single DCI is used to perform dynamic scheduling on a PDSCH or PUSCH on a specified CC at a higher layer and semi-persistent activation, deactivation, and/or retransmission on a DL SPS and/or UL CG on a specified CC at another higher layer.

In some implementations, a new x-bit (bit) field is introduced to the DCI, and this field indicates whether the DCI is applied to (1) to (6) or (a) to (c), or applied to dynamic scheduling of N carriers.

TABLE 8

| 2-bit field | Descriptions |
| --- | --- |
| 00 | Applied to (1) to (6) |
| 01 | Applied to (a) to (c) |
| 10 | Applied to only dynamic scheduling of N CCs |
| 11 | Reserved |

As shown in Table 8, when the field is 00, the field may indicate that the DCI is applied to (1) to (6). When the field is 01, the field may indicate that the DCI is applied to (a) to (c). When the field is 10, the field may indicate that the DCI is applied to only dynamic scheduling of N CCs.

In some implementations, the x-bit may be merged into a CIF domain as a joint filed. For example, x=1 bit, CIF=2 bits, and after merging, 3-bit is used as a joint filed.

TABLE 9

| 3-bit field | Descriptions |
| --- | --- |
| 000 | Dynamic scheduling of one carrier |
| 001 | Dynamic scheduling of CC #0 and CC #1 |
| 010 | Dynamic scheduling of CC #2 and CC #3 |
| 011 | Semi-persistent scheduling of one carrier |
| 100 | Semi-persistent scheduling of CC #0 and CC #1 |
| 101 | Semi-persistent scheduling of CC #2 and CC #3 |
| 110 | Dynamic scheduling of CC #0 and semi-persistent scheduling of CC #1 |
| 111 | Dynamic scheduling of CC #2 and semi-persistent scheduling of CC #3 |

As shown in Table 9, when the field is 000, the field is used to indicate to dynamically schedule one carrier. When the field is 001, the field is used to indicate to dynamically schedule the CC #0 and the CC #1. When the field is 010, the field is used to indicate to dynamically schedule the CC #2 and the CC #3. When the field is 011, the field is used to indicate to semi-persistently schedule one carrier. When the field is 100, the field is used to indicate to semi-persistently schedule the CC #0 and the CC #1. When the field is 101, the field is used to indicate to semi-persistently schedule the CC #2 and the CC #3. When the field is 110, the field is used to indicate to dynamically schedule the CC #0 and semi-persistently schedule the CC #1. When the field is 111, the field is used to indicate to dynamically schedule the CC #2 and semi-persistently schedule the CC #3.

In some implementations, in a multicarrier indicated by DC, a parameter field used to indicate a parameter value may be set. These parameters may include a DMRS, an MCS, an NDI, a Redundancy Version (RV), and the like. This may be determined according to an actual use requirement, and is not limited in this embodiment of this application. In addition, fields of these parameters are independent or shared, and the following three cases may be included:

Case 1

Each of carriers indicated by the DCI corresponds to one group of parameter indication fields, different parameter indication fields in one group of parameter indication fields corresponding to one carrier are used to indicate different transmission parameters of the one carrier, and different carriers correspond to different groups of parameter indication fields. In this case, all transmission parameters of the carrier indicated by the DCI have independent fields, which are independently coded.

Case 2

All carriers indicated by the DCI correspond to one group of parameter indication fields, and different parameter indication fields in the one group of parameter indication fields corresponding to all the carriers are used to indicate different transmission parameters of all the carriers. In this case, fields of all transmission parameters of the carriers indicated by the DCI are shared.

The following (a), (b), and (c) may be included.

(a) Transmission parameters indicated by the one group of parameter indication fields corresponding to all the carriers are transmission parameters shared by all the carriers indicated by the DCI. That is, transmission parameters of all the carriers are the same.

(b) Transmission parameters indicated by the one group of parameter indication fields corresponding to all the carriers are independent transmission parameters of all the carriers indicated by the DCI. That is, transmission parameters of all the carriers are different. A joint field is designed, and each codepoint of the joint field corresponds to a parameter configured by a higher layer for each scheduled CC.

(c) Transmission parameters indicated by the one group of parameter indication fields corresponding to all the carriers are transmission parameters associated with all the carriers indicated by the DCI, and the associated transmission parameter means that a transmission parameter of one carrier is determined according to a transmission parameter of another carrier. That is, transmission parameters of all the carriers are different. A higher layer configures a CC #j (0<j≤N) relative to a reference (reference) CC #i, for example, a parameter offset value delta of i=0, a field in the DCI indicates only a parameter of the reference CC #i, and a parameter of another CC is shifted by delta based on the parameter of the reference CC #i. Both i and j are positive integers.

Case 3

Each of all carriers indicated by the DCI correspond to one group of first parameter indication fields, different parameter indication fields in one group of first parameter indication fields corresponding to one carrier are used to indicate different transmission parameters of the one carrier, and different carriers correspond to different groups of parameter indication fields; and all the carriers indicated by the DCI correspond to one group of second parameter indication fields, and different parameter indication fields in the one group of second parameter indication fields are used to indicate different transmission parameters of all the carriers. In this case, fields of some transmission parameters in all the carriers indicated by the DCI are shared, and fields of some transmission parameters are independent.

It should be noted that for the case 3, fields of at least the following transmission parameters are independently configured for each scheduled CC: an MCS, an NDI, and an RV. A scheduling manner, such as activation, deactivation, and retransmission, of a DL SPS and/or UL CG on a scheduled CC may be determined by setting values of the MCS, NDI, and RV fields.

For example, it is assumed that NDI=0, and it is determined that the scheduling manner is activation or deactivation; or it is assumed that NDI=1, it is determined that the scheduling manner is retransmission.

When NDI=0, activation and deactivation may be determined by the MCS and RV fields. For example, if RV=all '0' and MCS≠all '1,' it is determined the scheduling manner is activation; or if RV=all '0' and MCS=all '1,' the scheduling manner is deactivation.

This embodiment of this application provides a multicarrier scheduling method. In a case that one piece of DCI supports scheduling of N carriers, in one manner, the network device may instruct, by using one piece of DCI, the UE to schedule semi-persistent configurations on a plurality of carriers in the N carriers; and in another manner, the network device may instruct, by using one piece of DCI, the UE to schedule semi-persistent configurations on a part of the N carriers, and schedule dynamic configurations on another part of the N carriers. Therefore, the network device does not need to deliver a plurality of pieces of DCI, thereby reducing overheads of downlink control signaling and reducing complexity of detecting downlink control signaling by the UE.

To illustrate this embodiment of this application more clearly, scheduling of the semi-persistent configurations on the M carriers or scheduling of the semi-persistent configurations on the X carriers and scheduling of the dynamic configurations on the Y carriers are separately described by using the following examples 1 to 5.

Example 1

For (1) in the foregoing embodiment, the DCI is used to indicate to activate the semi-persistent configurations on the M carriers.

Figure 3:
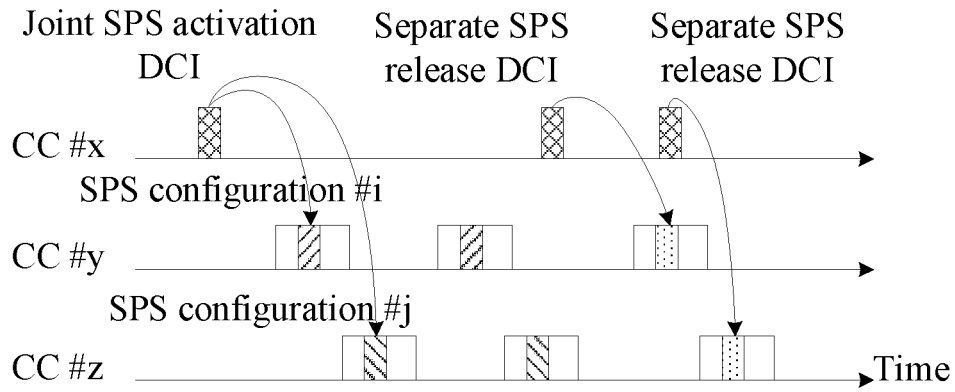
FIG. 3 is a first schematic diagram of multicarrier scheduling according to an embodiment of this application.

As shown in FIG. 3, one piece of "joint SPS activation DCI" and two pieces of "separate SPS release DCI" may be carried on a carrier CC #x. The "joint SPS activation DCI" may be used to indicate to activate an SPS configuration #i carried on a carrier CC #y and an SPS configuration #j carried on a carrier CC #z, one piece of "separate SPS release DCI" may be used to indicate to release the SPS configuration #i carried on the carrier CC #y, and the other piece of "separate SPS release DCI" may be used to indicate to release the SPS configuration #j carried on the carrier CC #z.

Example 2

For (2) in the foregoing embodiment, the DCI is used to indicate to deactivate the semi-persistent configurations on the M carriers.

Figure 4:
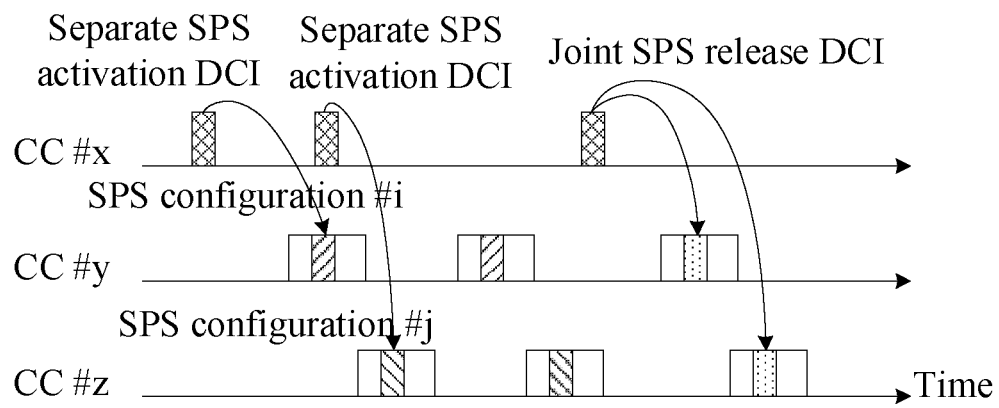
FIG. 4 is a second schematic diagram of multicarrier scheduling according to an embodiment of this application.

As shown in FIG. 4, two pieces of "separate SPS activation DCI" and one piece of "joint SPS release DCI" may be carried on a carrier CC #x. One piece of "separate SPS activation DCI" may be used to indicate to activate an SPS configuration #i carried on a carrier CC #y, the other piece of "separate SPS activation DCI" may be used to indicate to activate an SPS configuration #j carried on a carrier CC #z, and the "joint SPS release DCI" may be used to indicate to release the SPS configuration #i carried on the carrier CC #y and the SPS configuration #j carried on the carrier CC #z.

Example 3

For (3) in the foregoing embodiment, the DCI is used to indicate to retransmit the semi-persistent configurations on the M carriers.

Figure 5:
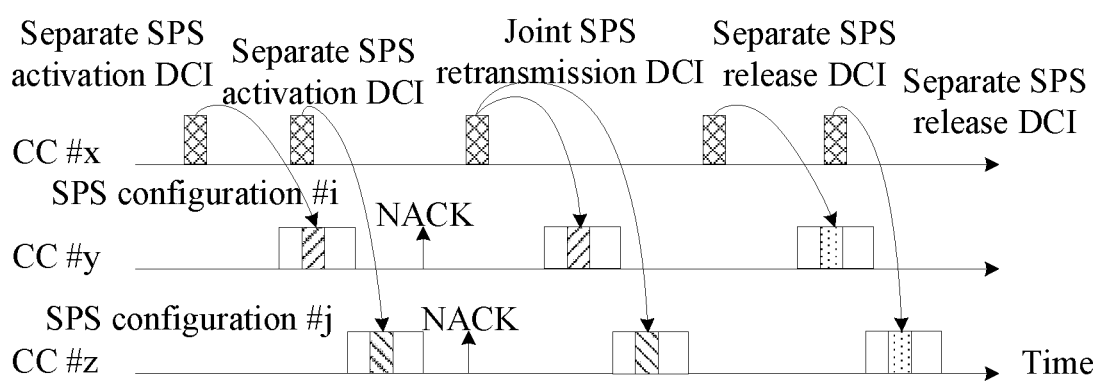
FIG. 5 is a third schematic diagram of multicarrier scheduling according to an embodiment of this application.

As shown in FIG. 5, two pieces of "separate SPS activation DCI," one piece of "joint SPS retransmission DCI", and two pieces of "separate SPS release DCI" may be carried on a carrier CC #x. One piece of "separate SPS activation DCI" may be used to indicate to activate an SPS configuration #i carried on a carrier CC #y, the other piece of "separate SPS activation DCI" may be used to indicate to activate an SPS configuration #j carried on a carrier CC #z, the "joint SPS retransmission DCI" may be used to indicate to retransmit the SPS configuration #i carried on the carrier CC #y and the SPS configuration #j carried on the carrier CC #z, one piece of "separate SPS release DCI" may be used to indicate to release the SPS configuration #i carried on the carrier CC #y, and the other piece of "separate SPS release DCI" may be used to indicate to release the SPS configuration #j carried on the carrier CC #z.

Example 4

For (4) to (6) in the foregoing embodiment, the DCI is used to indicate to activate the semi-persistent configurations on the P carriers, and deactivate and/or release the semi-persistent configurations on the Q carriers; or the DCI is used to indicate to activate the semi-persistent configurations on the P carriers, and retransmit the semi-persistent configurations on the Q carriers; or the DCI is used to indicate to deactivate and/or release the semi-persistent configurations on the P carriers, and retransmit the semi-persistent configurations on the Q carriers.

Figure 6:
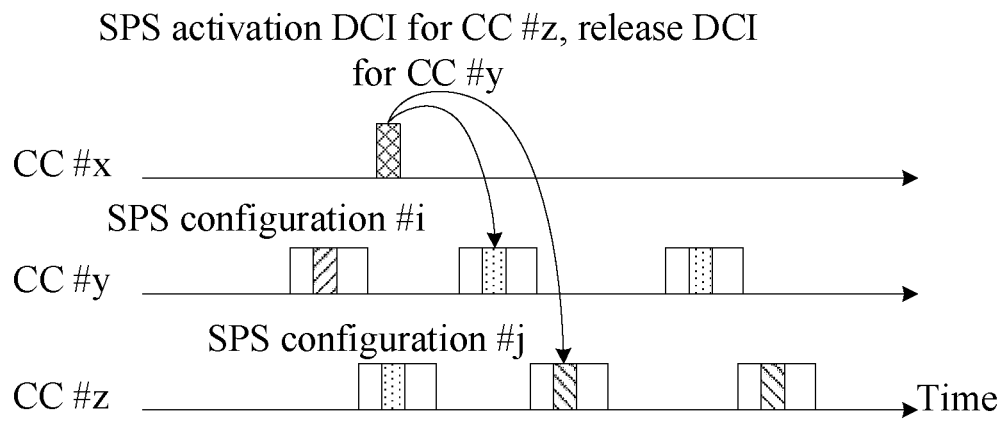
FIG. 6 is a fourth schematic diagram of multicarrier scheduling according to an embodiment of this application.

As shown in FIG. 6, one piece of "SPS activation DCI for CC #z, release DCI for CC #y (joint SPS activation DCI for CC #z, release DCI for CC #y)" may be carried on a carrier CC #x. The "SPS activation DCI for CC #z, release DCI for CC #y" may be used to indicate to activate an SPS configuration #j carried on a carrier CC #z and release an SPS configuration #i carried on a carrier CC #y.

Example 5

For (a) to (c) in the foregoing embodiment, the DCI is used to indicate to activate the semi-persistent configurations on the X carriers, and initially transmit or retransmit the dynamic configurations on the Y carriers; or the DCI is used to indicate to deactivate and/or release the semi-persistent configurations on the X carriers, and initially transmit or retransmit the dynamic configurations on the Y carriers; or the DCI is used to indicate to retransmit the semi-persistent configurations on the X carriers, and initially transmit or retransmit the dynamic configurations on the Y carriers.

Figure 7:
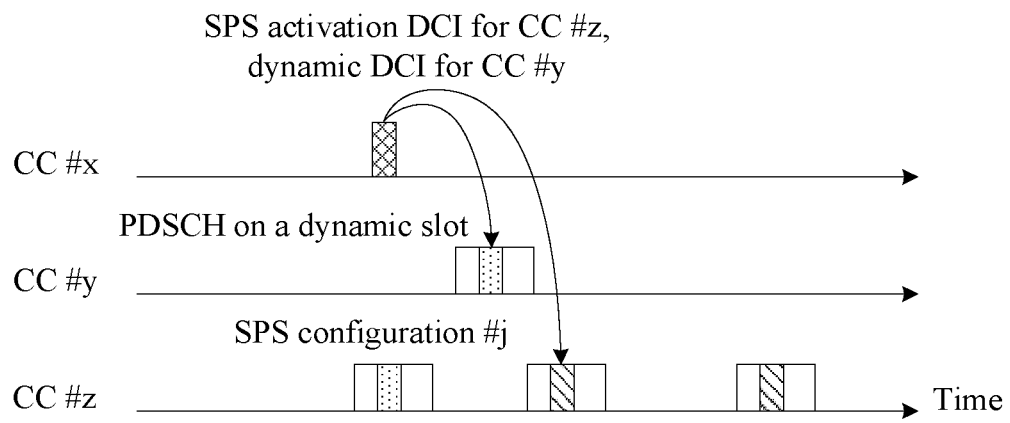
FIG. 7 is a fifth schematic diagram of multicarrier scheduling according to an embodiment of this application.

As shown in FIG. 7, one piece of "SPS activation DCI for CC #z, dynamic DCI for CC #y (SPS activation DCI for CC #z, dynamic DCI for CC #y)" may be carried on a carrier CC #x. The "SPS activation DCI for CC #z, dynamic DCI for CC #y" may be used to indicate to activate an SPS configuration #j carried on a carrier CC #z and dynamically schedule a PDSCH in one slot on a carrier CC #y.

It should be noted that, for the foregoing examples 1 to 5, in some implementations, the carrier CC #x is the carrier CC #y. In some implementations, the carrier CC #x is the carrier CC #z. In some implementations, the carrier CC #x is different from the carrier CC #y and the carrier CC #z. This may be determined based on an actual use requirement, and is not limited in this embodiment of this application.

Figure 8:
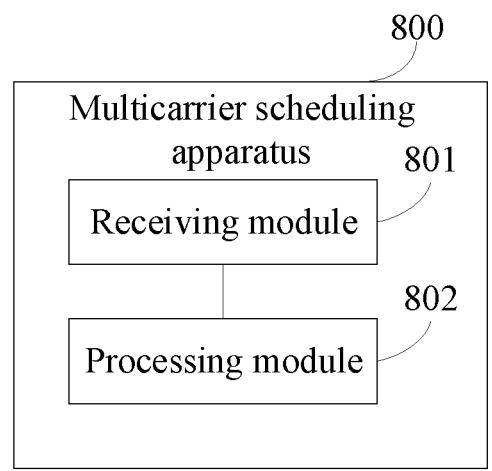
FIG. 8 is a first schematic structural diagram of a multicarrier scheduling apparatus according to an embodiment of this application.

As shown in FIG. 8, an embodiment of this application provides a multicarrier scheduling apparatus 800. The multicarrier scheduling apparatus 800 may include a receiving module 801. The receiving module 801 may be configured to receive DCI sent by a network device, where the DCI may be used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

In some implementations, the scheduling semi-persistent configurations on M carriers includes any one of the following: activating the semi-persistent configurations on the M carriers; deactivating and/or releasing the semi-persistent configurations on the M carriers; retransmitting the semi-persistent configurations on the M carriers; activating semi-persistent configurations on P carriers, and deactivating and/or releasing semi-persistent configurations on Q carriers; activating the semi-persistent configurations on the P carriers, and retransmitting the semi-persistent configurations on the Q carriers; and deactivating and/or releasing the semi-persistent configurations on the P carriers, and retransmitting the semi-persistent configurations on the Q carriers. The semi-persistent configuration may include at least one of the following: DL SPS, a UL CG, uplink semi-persistent CSI, and an uplink semi-persistent SRS. Both P and Q are positive integers, and a sum of P and Q is M.

In some implementations, the scheduling semi-persistent configurations on X carriers and scheduling dynamic configurations on Y carriers includes any one of the following: activating the semi-persistent configurations on the X carriers, and initially transmitting or retransmitting the dynamic configurations on the Y carriers; deactivating and/or releasing the semi-persistent configurations on the X carriers, and initially transmitting or retransmitting the dynamic configurations on the Y carriers; and retransmitting the semi-persistent configurations on the X carriers, and initially transmitting or retransmitting the dynamic configurations on the Y carriers. The semi-persistent configuration includes at least one of the following: DL SPS, a UL CG, uplink semi-persistent CSI, and an uplink semi-persistent SRS. The dynamic configuration includes at least one of the following: a PDSCH, a PUSCH, aperiodic CSI, and an aperiodic SRS.

In some implementations, the DCI may include a first indication field, and the first indication field may be used to indicate the M carriers or indicate the X carriers and the Y carriers.

In some implementations, the DCI may further include a second indication field, the second indication field may be used to indicate a semi-persistent configuration or a scheduling manner of a semi-persistent configuration, and the scheduling manner may include at least one of the following: activation, deactivation, and retransmission.

In some implementations, the second indication field is one group of indication fields; or the second indication field is a plurality of groups of indication fields, and a quantity of the plurality of groups of indication fields is the same as a quantity of carriers that are indicated by the first indication field and on which semi-persistent configurations are scheduled.

In some implementations, if at least one of the M carriers or the X carriers includes a plurality of semi-persistent configurations, and the second indication field is one group of indication fields, the second indication field is used to indicate at least one semi-persistent configuration, and the at least one semi-persistent configuration is a semi-persistent configuration included in at least two of the M carriers or the X carriers; or if each of the M carriers or the X carriers includes one same semi-persistent configuration, and the second indication field is one group of indication fields, the second indication field is used to indicate a scheduling manner of the one same semi-persistent configuration.

In some implementations, if one of the M carriers or the X carriers includes a plurality of semi-persistent configurations, and the second indication field is a plurality of groups of indication fields, one second indication field is used to indicate at least one semi-persistent configuration, and the at least one semi-persistent configuration is a semi-persistent configuration in the plurality of semi-persistent configurations; or if one of the M carriers or the X carriers includes one semi-persistent configuration, and the second indication field is a plurality of groups of indication fields, one second indication field is used to indicate a scheduling manner of the one semi-persistent configuration.

In some implementations, as shown in FIG. 8, the multicarrier scheduling apparatus provided in this embodiment of this application may further include a processing module 802. The processing module 802 may be configured to: if the DCI is used to indicate to perform semi-persistent scheduling on the M carriers, scramble the DCI by using a CS-RNTI; or if the DCI is used to indicate to perform semi-persistent scheduling on the X carriers and perform dynamic scheduling on the Y carriers, scramble the DCI by using a CS-RNTI, a C-RNTI, or a predefined RNTI.

In some implementations, each of carriers indicated by the DCI corresponds to one group of parameter indication fields, different parameter indication fields in one group of parameter indication fields corresponding to one carrier are used to indicate different transmission parameters of the one carrier, and different carriers correspond to different groups of parameter indication fields; or
all carriers indicated by the DCI correspond to one group of parameter indication fields, and different parameter indication fields in the one group of parameter indication fields corresponding to all the carriers are used to indicate different transmission parameters of all the carriers; or each of carriers indicated by the DCI correspond to one group of first parameter indication fields, different parameter indication fields in one group of first parameter indication fields corresponding to one carrier are used to indicate different transmission parameters of the one carrier, and different carriers correspond to different groups of parameter indication fields; and all carriers indicated by the DCI correspond to one group of second parameter indication fields, and different parameter indication fields in the one group of second parameter indication fields are used to indicate different transmission parameters of all the carriers.

In some implementations, transmission parameters indicated by the one group of parameter indication fields corresponding to all the carriers are transmission parameters shared by all the carriers indicated by the DCI; or transmission parameters indicated by the one group of parameter indication fields corresponding to all the carriers are independent transmission parameters of all the carriers indicated by the DCI; or transmission parameters indicated by the one group of parameter indication fields corresponding to all the carriers are transmission parameters associated with all the carriers indicated by the DCI, and the associated transmission parameter means that a transmission parameter of one carrier is determined according to a transmission parameter of another carrier.

In some implementations, there is one semi-persistent configuration on each of the M carriers or the X carriers; or there is at least one semi-persistent configuration on each of at least one of the M carriers or the X carriers.

In some implementations, the DCI is carried on one of the N carriers; or the DCI is carried on a carrier different from the N carriers.

The multicarrier scheduling apparatus provided in this embodiment of this application can implement the processes implemented by the UE in the method embodiments in FIG. 1 to FIG. 7. To avoid repetition, details are not described herein again. The multicarrier scheduling apparatus is the UE or a function module in the UE. This may be determined according to an actual use requirement.

According to the multicarrier scheduling apparatus provided in this embodiment of this application, in a case that one piece of DCI supports scheduling of N carriers, in one manner, the multicarrier scheduling apparatus may instruct, by using one piece of DCI, to schedule semi-persistent configurations on a plurality of carriers in the N carriers; and in another manner, the multicarrier scheduling apparatus may instruct, by using one piece of DCI, to schedule semi-persistent configurations on a part of the N carriers, and schedule dynamic configurations on another part of the N carriers. Therefore, overheads of downlink control signaling are reduced and complexity of detecting downlink control signaling is reduced.

Figure 9:
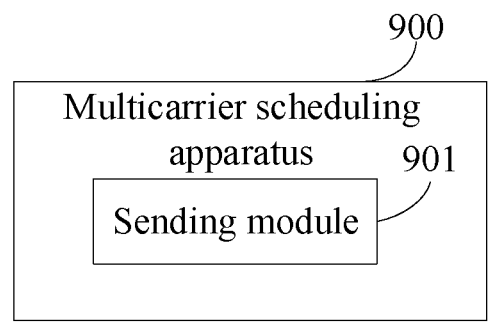
FIG. 9 is a second schematic structural diagram of a multicarrier scheduling apparatus according to an embodiment of this application.

As shown in FIG. 9, an embodiment of this application provides a multicarrier scheduling apparatus 900. The multicarrier scheduling apparatus 900 may include a sending module 901. The sending module 901 may be configured to send DCI to UE, where the DCI may be used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

In some implementations, the scheduling semi-persistent configurations on M carriers includes any one of the following: activating the semi-persistent configurations on the M carriers; deactivating and/or releasing the semi-persistent configurations on the M carriers; retransmitting the semi-persistent configurations on the M carriers; activating semi-persistent configurations on P carriers, and deactivating and/or releasing semi-persistent configurations on Q carriers; activating the semi-persistent configurations on the P carriers, and retransmitting the semi-persistent configurations on the Q carriers; and deactivating and/or releasing the semi-persistent configurations on the P carriers, and retransmitting the semi-persistent configurations on the Q carriers. The semi-persistent configuration may include at least one of the following: DL SPS, a UL CG, uplink semi-persistent CSI, and an uplink semi-persistent SRS. Both P and Q are positive integers, and a sum of P and Q is M.

In some implementations, the scheduling semi-persistent configurations on X carriers and scheduling dynamic configurations on Y carriers includes any one of the following: activating the semi-persistent configurations on the X carriers, and initially transmitting or retransmitting the dynamic configurations on the Y carriers; deactivating and/or releasing the semi-persistent configurations on the X carriers, and initially transmitting or retransmitting the dynamic configurations on the Y carriers; and retransmitting the semi-persistent configurations on the X carriers, and initially transmitting or retransmitting the dynamic configurations on the Y carriers. The semi-persistent configuration includes at least one of the following: DL SPS, a UL CG, uplink semi-persistent CSI, and an uplink semi-persistent SRS. The dynamic configuration includes at least one of the following: a PDSCH, a PUSCH, aperiodic CSI, and an aperiodic SRS.

In some implementations, the DCI may include a first indication field, and the first indication field may be used to indicate the M carriers or indicate the X carriers and the Y carriers.

In some implementations, the DCI may further include a second indication field, the second indication field may be used to indicate a semi-persistent configuration or a scheduling manner of a semi-persistent configuration, and the scheduling manner may include at least one of the following: activation, deactivation, and retransmission.

In some implementations, the second indication field is one group of indication fields; or the second indication field is a plurality of groups of indication fields, and a quantity of the plurality of groups of indication fields is the same as a quantity of carriers that are indicated by the first indication field and on which semi-persistent configurations are scheduled.

In some implementations, if at least one of the M carriers or the X carriers includes a plurality of semi-persistent configurations, and the second indication field is one group of indication fields, the second indication field is used to indicate at least one semi-persistent configuration, and the at least one semi-persistent configuration is a semi-persistent configuration included in at least two of the M carriers or the X carriers; or if each of the M carriers or the X carriers includes one same semi-persistent configuration, and the second indication field is one group of indication fields, the second indication field is used to indicate a scheduling manner of the one same semi-persistent configuration.

In some implementations, if one of the M carriers or the X carriers includes a plurality of semi-persistent configurations, and the second indication field is a plurality of groups of indication fields, one second indication field is used to indicate at least one semi-persistent configuration, and the at least one semi-persistent configuration is a semi-persistent configuration in the plurality of semi-persistent configurations; or if one of the M carriers or the X carriers includes one semi-persistent configuration, and the second indication field is a plurality of groups of indication fields, one second indication field is used to indicate a scheduling manner of the one semi-persistent configuration.

In some implementations, each of carriers indicated by the DCI corresponds to one group of parameter indication fields, different parameter indication fields in one group of parameter indication fields corresponding to one carrier are used to indicate different transmission parameters of the one carrier, and different carriers correspond to different groups of parameter indication fields; or all carriers indicated by the DCI correspond to one group of parameter indication fields, and different parameter indication fields in the one group of parameter indication fields corresponding to all the carriers are used to indicate different transmission parameters of all the carriers; or each of carriers indicated by the DCI correspond to one group of first parameter indication fields, different parameter indication fields in one group of first parameter indication fields corresponding to one carrier are used to indicate different transmission parameters of the one carrier, and different carriers correspond to different groups of parameter indication fields; and all carriers indicated by the DCI correspond to one group of second parameter indication fields, and different parameter indication fields in the one group of second parameter indication fields are used to indicate different transmission parameters of all the carriers.

In some implementations, transmission parameters indicated by the one group of parameter indication fields corresponding to all the carriers are transmission parameters shared by all the carriers indicated by the DCI; or transmission parameters indicated by the one group of parameter indication fields corresponding to all the carriers are independent transmission parameters of all the carriers indicated by the DCI; or transmission parameters indicated by the one group of parameter indication fields corresponding to all the carriers are transmission parameters associated with all the carriers indicated by the DCI, and the associated transmission parameter means that a transmission parameter of one carrier is determined according to a transmission parameter of another carrier.

In some implementations, there is one semi-persistent configuration on each of the M carriers or the X carriers; or there is at least one semi-persistent configuration on each of at least one of the M carriers or the X carriers.

In some implementations, the DCI is carried on one of the N carriers; or the DCI is carried on a carrier different from the N carriers.

The multicarrier scheduling apparatus provided in this embodiment of this application can implement the processes implemented by the network device in the method embodiments in FIG. 1 to FIG. 7. To avoid repetition, details are not described herein again. The multicarrier scheduling apparatus is the network device or a function module in the network device. This may be determined according to an actual use requirement.

According to the multicarrier scheduling apparatus provided in this embodiment of this application, in a case that one piece of DCI supports scheduling of N carriers, in one manner, the multicarrier scheduling apparatus may instruct, by using one piece of DCI, the UE to schedule semi-persistent configurations on a plurality of carriers in the N carriers; and in another manner, the multicarrier scheduling apparatus may instruct, by using one piece of DCI, the UE to schedule semi-persistent configurations on a part of the N carriers, and schedule dynamic configurations on another part of the N carriers. Therefore, the network device does not need to deliver a plurality of pieces of DCI, thereby reducing overhead of downlink control signaling.

In some implementations, this application further provides UE, including a processor, a memory, and a program or an instruction that is stored in the memory and that can be run on the processor. When the program or the instruction is executed by the processor, the processes of the foregoing multicarrier scheduling method embodiment are implemented and a same technical effect can be achieved. To avoid repetition, details are not described herein again.

In some implementations, this application further provides a network device, including a processor, a memory, and a program or an instruction that is stored in the memory and that can be run on the processor. When the program or the instruction is executed by the processor, the processes of the foregoing multicarrier scheduling method embodiment are implemented and a same technical effect can be achieved. To avoid repetition, details are not described herein again.

Figure 10:
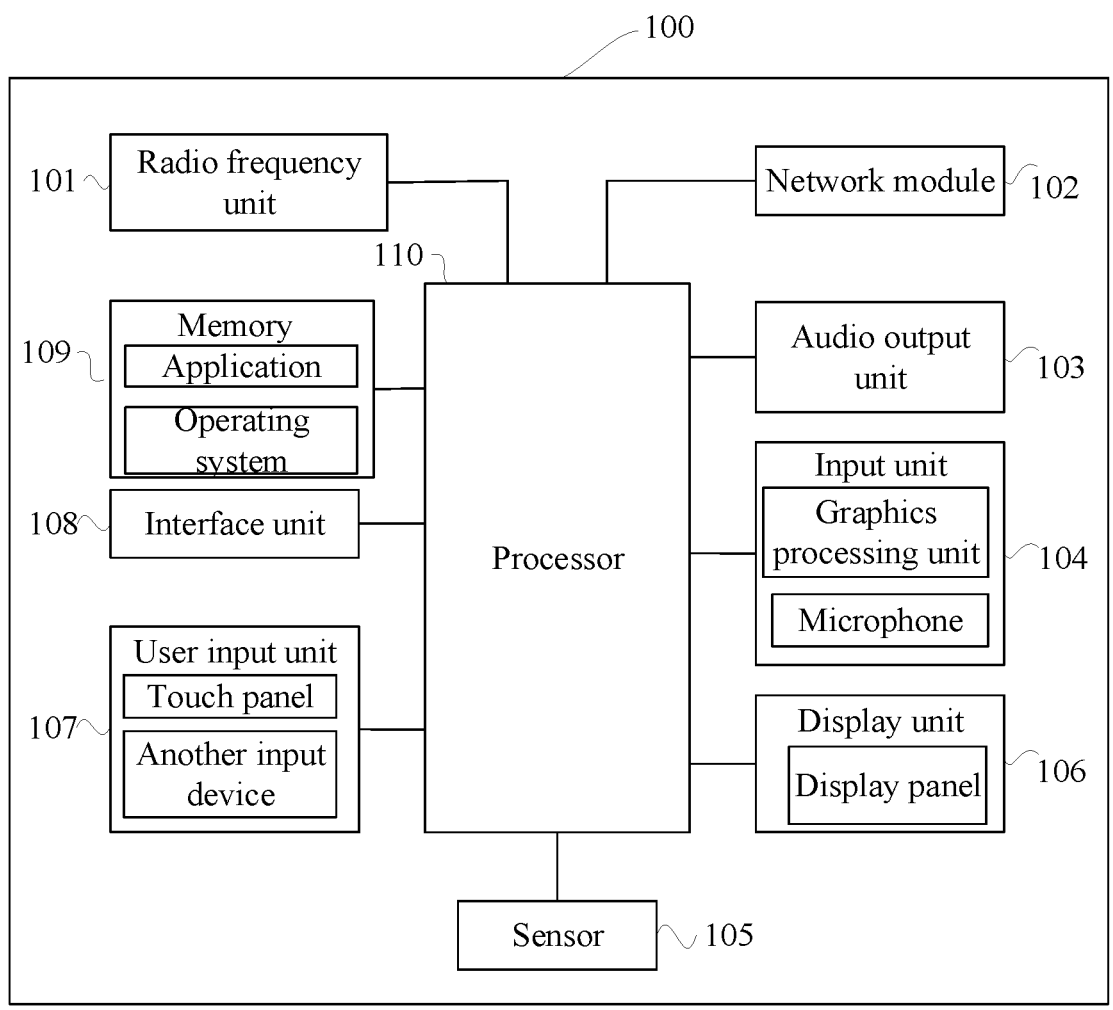
FIG. 10 is a schematic diagram of hardware of UE according to an embodiment of this application.

FIG. 10 is a schematic structural diagram of hardware of UE according to an embodiment of this application. UE 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

The input unit 104 may include a Graphics Processing Unit (GPU) and a microphone, and the graphics processing unit processes image data of a still picture or video obtained by an image capture apparatus (such as a camera) in a video capture mode or an image capture mode. The display unit 106 may include a display panel. In some implementations, the display panel may be configured in a form such as a liquid crystal display or an organic light-emitting diode.

The user input unit 107 may include a touch panel and another input device, and the touch panel is also referred to as a touchscreen. The touch panel may include two parts: a touch detection apparatus and a touch controller. The another input device may include but is not limited to a physical keyboard, a functional button (such as a volume control button or a power on/off button), a trackball, a mouse, and a joystick. Details are not described herein.

The memory 109 may include an application and an operating system, where a storage program or an instruction area may store the operating system, an application or an instruction (such as a sound play function or an image play function) required by at least one function, and the like. In addition, the memory 109 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 110 may include one or more processing units. In some implementations, an application processor and a modem processor may be integrated into the processor 110, the application processor mainly processes an operating system, a user interface, an application or an instruction, and the like, and the modem processor mainly processes wireless communication, for example, a baseband processor. It can be understood that, alternatively, the modem processor may not be integrated into the processor 110.

A person skilled in the art can understand that the UE 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 10 does not constitute a limitation on the electronic device. The electronic device may include components more or fewer than those shown in the diagram, a combination of some components, or different component arrangements. Details are not described herein. The radio frequency unit 101 may be configured to receive DCI sent by a network device, where the DCI may be used to indicate to schedule semi-persistent configurations on M carriers, or indicate to schedule semi-persistent configurations on X carriers and schedule dynamic configurations on Y carriers, and the M carriers, the X carriers, and the Y carriers are all carriers in N carriers on which the DCI supports scheduling. Both M and N are integers greater than or equal to 2, both X and Y are positive integers, M is less than or equal to N, and a sum of X and Y is less than or equal to N.

This embodiment of this application provides UE. In a case that one piece of DCI supports scheduling of N carriers, in one manner, the UE may instruct, by using one piece of DCI, to schedule semi-persistent configurations on a plurality of carriers in the N carriers; and in another manner, the UE may instruct, by using one piece of DCI, to schedule semi-persistent configurations on a part of the N carriers, and schedule dynamic configurations on another part of the N carriers. Therefore, overheads of downlink control signaling are reduced and complexity of detecting downlink control signaling by the UE is reduced.

Figure 11:
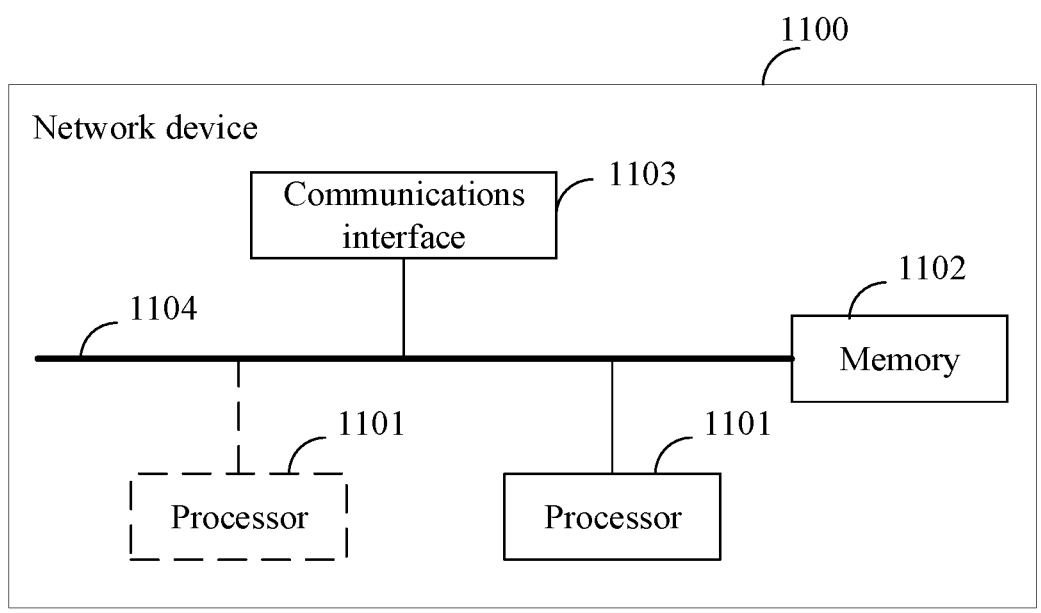
FIG. 11 is a schematic diagram of hardware of a network device according to an embodiment of this application.

FIG. 11 is a schematic structural diagram of hardware of a network device according to an embodiment of this application. As shown in FIG. 11, a network device 1100 may include one or more processors 1101, a memory 1102, a communications interface 1103, and a bus 1104.

The one or more processors 1101, the memory 1102, and the communications interface 1103 are connected to each other by using the bus 1104. The bus 1104 may be a Peripheral Component Interconnect (PCI) bus, an Extended Industry Standard Architecture (EISA) bus, or the like. The bus 1104 may be classified into an address bus, a data bus, a control bus, and the like. For ease of indication, the bus is indicated by using only one bold line in FIG. 11. However, it does not indicate that there is only one bus or only one type of bus. In addition, the network device 1100 may further include some function modules not shown, and details are not described herein.

An embodiment of this application further provides a readable storage medium. The readable storage medium stores a program or an instruction, and when the program or the instruction is executed by a processor, the processes of the foregoing multicarrier scheduling method embodiment are implemented and a same technical effect can be achieved. To avoid repetition, details are not described herein again.

The processor is the processor in the UE or the network device in the foregoing embodiment. The readable storage medium includes a computer-readable storage medium, such as a computer ROM, a RAM, a magnetic disk, or an optical disc.

An embodiment of this application further provides a chip. The chip includes a processor and a communications interface, the communications interface is coupled to the processor, and the processor is configured to run a program or an instruction to implement the processes of the foregoing multicarrier scheduling method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A multicarrier scheduling method, comprising:
receiving Downlink Control Information (DCI) sent by a network device, wherein the downlink control information is used to schedule semi-persistent configurations on M carriers, or to schedule semi-persistent configurations on X carriers and schedule dynamic configurations on Y carriers, and the M carriers, the X carriers, and the Y carriers are all carriers in N carriers on which the downlink control information supports scheduling, and wherein both M and N are integers greater than or equal to 2, both X and Y are positive integers, M is less than or equal to N, and a sum of X and Y is less than or equal to N,
wherein the downlink control information comprises a first indication field that comprises a Cross-carrier Indication Field (CIF) in the DCI, and the first indication field is used to indicate the M carriers or indicate the X carriers and the Y carriers.

2. The method according to claim 1, wherein the scheduling semi-persistent configurations on M carriers comprises any one of the following:
activating the semi-persistent configurations on the M carriers;
deactivating or releasing the semi-persistent configurations on the M carriers;
retransmitting the semi-persistent configurations on the M carriers;
activating semi-persistent configurations on P carriers, and deactivating or releasing semi-persistent configurations on Q carriers;
activating the semi-persistent configurations on the P carriers, and retransmitting the semi-persistent configurations on the Q carriers; or
deactivating or releasing the semi-persistent configurations on the P carriers, and retransmitting the semi-persistent configurations on the Q carriers, wherein
the semi-persistent configuration comprises at least one of the following:
a DownLink Semi-Persistent Scheduling (DL SPS), an UpLink Configuration Grant (UL CG), uplink semi-persistent channel state information, or an uplink semi-persistent sounding reference signal, and wherein both P and Q are positive integers, or a sum of P and Q is M.

3. The method according to claim 1, wherein the scheduling semi-persistent configurations on X carriers and scheduling dynamic configurations on Y carriers comprises any one of the following:
activating the semi-persistent configurations on the X carriers, and initially transmitting or retransmitting the dynamic configurations on the Y carriers;
deactivating or releasing the semi-persistent configurations on the X carriers, and initially transmitting or retransmitting the dynamic configurations on the Y carriers; or
retransmitting the semi-persistent configurations on the X carriers, and initially transmitting or retransmitting the dynamic configurations on the Y carriers, wherein
the semi-persistent configuration comprises at least one of the following: a DownLink Semi-Persistent Scheduling (DL SPS), an UpLink Configuration Grant (UL CG), uplink semi-persistent channel state information, or an uplink semi-persistent sounding reference signal; and wherein
the dynamic configuration comprises at least one of the following: a Physical Downlink Shared CHannel (PDSCH), a Physical Uplink Shared CHannel (PUSCH), aperiodic channel state information, or an aperiodic sounding reference signal.

4. The method according to claim 1, wherein the first indication field further comprises at least one of the following:
a field obtained by extending the existing field in the DCI. or
an independent field added to the DCI,
wherein all fields of each scheduled cell do not need to be independently configured.

5. The method according to claim 1, wherein the downlink control information further comprises a second indication field, the second indication field is used to indicate a semi-persistent configuration or a scheduling manner of a semi-persistent configuration, and the scheduling manner comprises at least one of the following: activation, deactivation, or retransmission.

6. The method according to claim 5, wherein the second indication field is one group of indication fields; or the second indication field is a plurality of groups of indication fields, and a quantity of the plurality of groups of indication fields is the same as a quantity of carriers that are indicated by the first indication field and on which semi-persistent configurations are scheduled.

7. The method according to claim 6, wherein when at least one of the M carriers or the X carriers comprises a plurality of semi-persistent configurations, and the second indication field is one group of indication fields, the second indication field is used to indicate at least one semi-persistent configuration, and the at least one semi-persistent configuration is a semi-persistent configuration comprised in at least two of the M carriers or the X carriers; or when each of the M carriers or the X carriers comprises one same semi-persistent configuration, and the second indication field is one group of indication fields, the second indication field is used to indicate a scheduling manner of the one same semi-persistent configuration.

8. The method according to claim 6, wherein when one of the M carriers or the X carriers comprises a plurality of semi-persistent configurations, and the second indication field is a plurality of groups of indication fields, one second indication field is used to indicate at least one semi-persistent configuration, and the at least one semi-persistent configuration is a semi-persistent configuration in the plurality of semi-persistent configurations; or when one of the M carriers or the X carriers comprises one semi-persistent configuration, and the second indication field is a plurality of groups of indication fields, one second indication field is used to indicate a scheduling manner of the one semi-persistent configuration.

9. The method according to claim 1, further comprising:
when the downlink control information is used to perform semi-persistent scheduling on the M carriers, scrambling the downlink control information by using a Configured Scheduling Radio Network Temporary Identifier (CS-RNTI); or when the downlink control information is used to perform semi-persistent scheduling on the X carriers and perform dynamic scheduling on the Y carriers, scrambling the downlink control information by using a CS-RNTI, a Cell Radio Network Temporary Identifier (C-RNTI), or a predefined RNTI.

10. The method according to claim 1, wherein each of carriers indicated by the downlink control information corresponds to one group of parameter indication fields, different parameter indication fields in one group of parameter indication fields corresponding to one carrier are used to indicate different transmission parameters of the one carrier, and different carriers correspond to different groups of parameter indication fields;

all carriers indicated by the downlink control information correspond to one group of parameter indication fields, and different parameter indication fields in the one group of parameter indication fields corresponding to all the carriers are used to indicate different transmission parameters of all the carriers; or each of carriers indicated by the downlink control information correspond to one group of first parameter indication fields, different parameter indication fields in one group of first parameter indication fields corresponding to one carrier are used to indicate different transmission parameters of the one carrier, and different carriers correspond to different groups of parameter indication fields, and all carriers indicated by the downlink control information correspond to one group of second parameter indication fields, and different parameter indication fields in the one group of second parameter indication fields are used to indicate different transmission parameters of all the carriers.

11. The method according to claim 10, wherein transmission parameters indicated by the one group of parameter indication fields corresponding to all the carriers are transmission parameters shared by all the carriers indicated by the downlink control information;

transmission parameters indicated by the one group of parameter indication fields corresponding to all the carriers are independent transmission parameters of all the carriers indicated by the downlink control information; or transmission parameters indicated by the one group of parameter indication fields corresponding to all the carriers are transmission parameters associated with all the carriers indicated by the downlink control information, and the associated transmission parameter means that a transmission parameter of one carrier is determined according to a transmission parameter of another carrier.

12. The method according to claim 1, wherein there is one semi-persistent configuration on each of the M carriers or the X carriers; or there is at least one semi-persistent configuration on each of at least one of the M carriers or the X carriers.

13. The method according to claim 1, wherein the downlink control information is carried on one of the N carriers; or the downlink control information is carried on a carrier different from the N carriers.

14. A multicarrier scheduling method, comprising:
sending Downlink Control Information (DCI) to user equipment, wherein the downlink control information is used to schedule semi-persistent configurations on M carriers, or schedule semi-persistent configurations on X carriers and schedule dynamic configurations on Y carriers, and the M carriers, the X carriers, and the Y carriers are all carriers in N carriers on which the downlink control information supports scheduling, and wherein both M and N are integers greater than or equal to 2, both X and Y are positive integers, M is less than or equal to N, and a sum of X and Y is less than or equal to N, wherein the downlink control information comprises a first indication field that comprises a Cross-carrier Indication Field (CIF) in the DCI, and the first indication field is used to indicate the M carriers or indicate the X carriers and the Y carriers.

15. The method according to claim 14, wherein the scheduling semi-persistent configurations on M carriers comprises any one of the following:

activating the semi-persistent configurations on the M carriers;

deactivating or releasing the semi-persistent configurations on the M carriers;

retransmitting the semi-persistent configurations on the M carriers;

activating semi-persistent configurations on P carriers, and deactivating or releasing semi-persistent configurations on Q carriers;

activating the semi-persistent configurations on the P carriers, and retransmitting the semi-persistent configurations on the Q carriers; or deactivating or releasing the semi-persistent configurations on the P carriers, and retransmitting the semi-persistent configurations on the Q carriers, wherein the semi-persistent configuration comprises at least one of the following: a DownLink Semi-Persistent Scheduling (DL SPS), an UpLink Configuration Grant (UL CG), uplink semi-persistent channel state information, or an uplink semi-persistent sounding reference signal, and wherein both P and Q are positive integers, and a sum of P and Q is M.

16. The method according to claim 14, wherein the scheduling semi-persistent configurations on X carriers and scheduling dynamic configurations on Y carriers comprises any one of the following:

activating the semi-persistent configurations on the X carriers, and initially transmitting or retransmitting the dynamic configurations on the Y carriers;

deactivating or releasing the semi-persistent configurations on the X carriers, and initially transmitting or retransmitting the dynamic configurations on the Y carriers; or retransmitting the semi-persistent configurations on the X carriers, and initially transmitting or retransmitting the dynamic configurations on the Y carriers, wherein the semi-persistent configuration comprises at least one of the following: a DownLink Semi-Persistent Scheduling (DL SPS), an UpLink Configuration Grant (UL CG), uplink semi-persistent channel state information, or an uplink semi-persistent sounding reference signal, and wherein the dynamic configuration comprises at least one of the following: a Physical Downlink Shared CHannel (PDSCH), a Physical Uplink Shared CHannel (PUSCH), aperiodic channel state information, or an aperiodic sounding reference signal.

17. The method according to claim 14, wherein the first indication field further comprises at least one of the following:

a field obtained by extending the existing field in the DCI or an independent field added to the DCI, wherein all fields of each scheduled cell do not need to be independently configured.

18. The method according to claim 14, wherein the downlink control information further comprises a second indication field, the second indication field is used to indicate a semi-persistent configuration or a scheduling manner of a semi-persistent configuration, and the scheduling manner comprises at least one of the following: activation, deactivation, or retransmission.

19. The method according to claim 18, wherein the second indication field is one group of indication fields; or the second indication field is a plurality of groups of indication fields, and a quantity of the plurality of groups of indication fields is the same as a quantity of carriers that are indicated by the first indication field and on which semi-persistent configurations are scheduled.

20. A user equipment, comprising:

a memory storing computer-readable instructions; and a processor coupled to the memory and configured to execute the computer-readable instructions, wherein the computer-readable instructions, when executed by the processor, cause the processor to perform operations comprising:

receiving Downlink Control Information (DCI) sent by a network device, wherein the downlink control information is used to schedule semi-persistent configurations on M carriers, or schedule semi-persistent configurations on X carriers and schedule dynamic configurations on Y carriers, and the M carriers, the X carriers, and the Y carriers are all carriers in N carriers on which the downlink control information supports scheduling, and wherein both M and N are integers greater than or equal to 2, both X and Y are positive integers, M is less than or equal to N, and a sum of X and Y is less than or equal to N, wherein the downlink control information comprises a first indication field that comprises a Cross-carrier Indication Field (CIF) in the DCI, and the first indication field is used to indicate the M carriers or indicate the X carriers and the Y carriers.

* * * * *